Dec. 10, 1946. G. E. KLOOTE 2,412,274
APPARATUS FOR MOLDING PLYWOOD PANELS
Filed Nov. 22, 1943

Inventor
George E. Kloote
By Fred Gerlach
his Atty

Patented Dec. 10, 1946

2,412,274

UNITED STATES PATENT OFFICE 2,412,274

APPARATUS FOR MOLDING PLYWOOD PANELS

George E. Kloote, Grand Rapids, Mich., assignor to Haskelite Manufacturing Corporation, Grand Rapids, Mich., a corporation of New York Application November 22, 1943, Serial No. 511,275

6 Claims. (Cl. 144—281)

The invention relates to apparatus for molding plywood panels having curved bends for forming edges, such as the leading-edges of airplane wings or other control surfaces.

One object of the invention is to provide improved apparatus for molding plywood panels with curved edge-forming bends by which the sheets of veneer in the bends will be firmly pressed and molded together.

Another object of the invention is to provide apparatus for molding panels with edge-forming bends which includes a rigid male die and an elastic blanket which covers the assembled sheets on the die and by which the sheets of veneer at the bends will be molded together in closely fitting relation.

A still further object of the invention is to provide improved molding apparatus for plywood panels provided with edge-forming bends in which the plywood sheets are shaped on the outer face of a male die which can be formed of plate metal and on which the panel will be molded with pressure subjected to the assembled sheets between an elastic blanket and the die.

Another object of the invention is to provide improved apparatus for molding plywood panels having edge-forming bends.

Other objects of the invention will appear from the detailed description.

The invention consists in the several novel features hereinafter set forth and more particularly defined by claims at the conclusion hereof.

Figure 1:
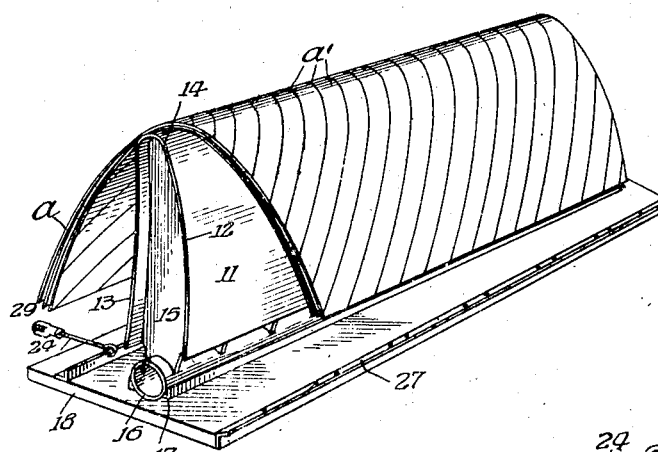
Fig. 1 is a perspective of the die with superimposed sheets of veneer interleaved with glue and laid on the die preparatory to shaping the sheets to the die.
Figure 2:
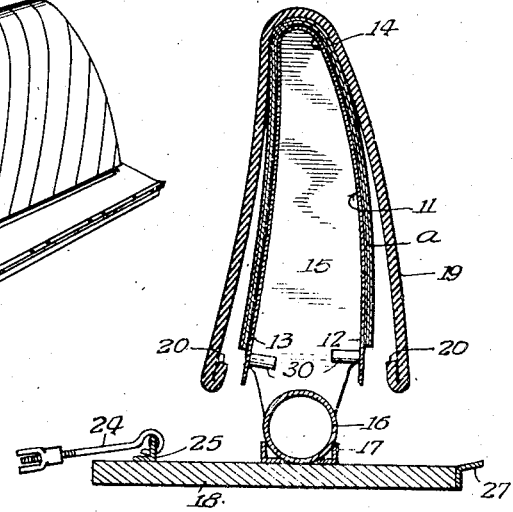
Fig. 2 is a transverse section of the die and sheets shown in Fig. 1.
Figure 3:
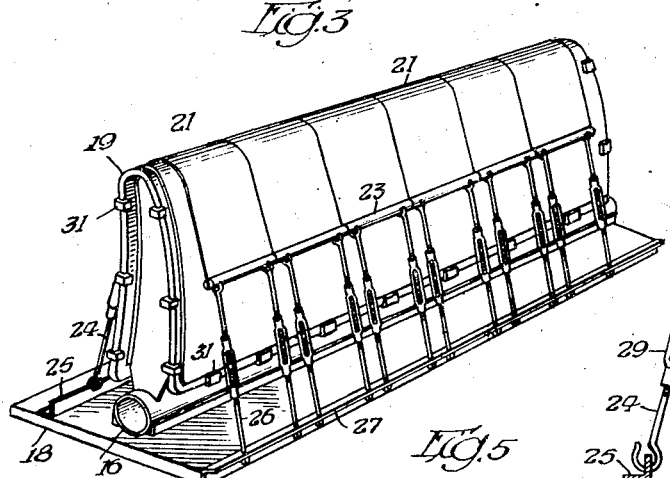
Fig. 3 is a perspective of the apparatus with the sheets of veneer secured on the die by the elastic blanket and the compression means for the sheets at the edge-forming bend of the die, the apparatus being assembled for placement in an oven for thermo-setting the adhesive between the sheets of veneer and molding the panel into permanent shape.
Figure 4:
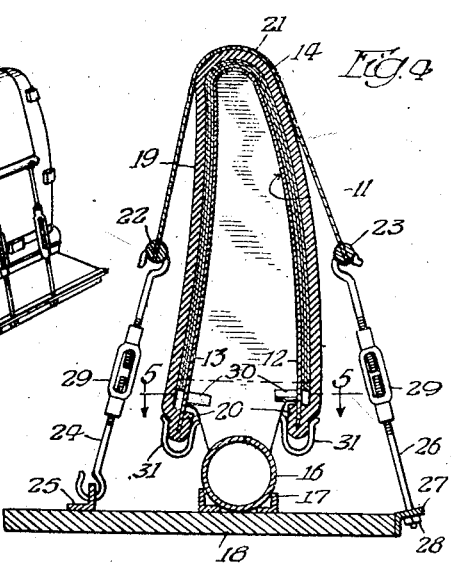
Fig. 4 is a transverse section of the apparatus as shown in Fig. 3.
Figure 5:
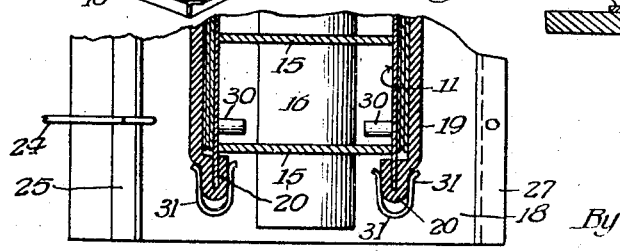
Fig. 5 is a section taken on line 5—5 of Fig. 4.

The invention is exemplified in apparatus which comprises a rigid base of sufficient length to support a male die 11 for forming a panel of any desired length. The die 11 comprises a side 12 which conforms to the internal contour of the portion of the suction face of a nose-section of an airplane wing, a side 13 conforming to the internal contour of the nose-portion of the pressure face of the wing, and a curved bend 14 which conforms to the internal contour of the leading-edge of the wing, and joins the sides 12 and 13. The outer face of the die is shaped conformably to the airfoil cross-section of an airplane wing or control surface. The die 11 is formed of plate metal and cross-walls 15, spaced apart longitudinally of the die, are welded to the inner face of the die so that the die will be rigid. The cross-walls 15 support the die and their lower ends are welded to a tubular structural member 16 which is welded to angle bars 17 and to a flat base or support 18. The lower edges of sides 12 and 13 of the die are spaced from the tubular member 16 and the cross-walls 15 are cut away adjacent the sides 12 and 13 to provide a clearance along the margin of the inner face of the die for receiving the elastic blanket hereinafter described.

In the fabrication of the panels, sheets or plies of wood veneer a or other material used in laminated panels, are superimposed in the number required for the thickness of the panel desired. In fabricating panels of large area, sheets or strips of wood veneer a' are assembled together in edgewise relation to form each ply or layer of the panel. In practice, the sheets of veneer and glue are usually progressively assembled, interleaved with sheets of glue, on a work table and temporarily secured by C-clamps and wooden bars along opposed edges of the assembly and then transported by an overhead crane and carefully lowered on the die with the central portion of the assembly on the edge-forming bend 14 of the die, as illustrated in Fig. 1, after which the bars are removed. The directions of the grain of the veneer in the successive layers or plies are usually arranged perpendicularly to one another. The sheets will flex downwardly from the edge-forming portion 14 of the die, as illustrated in Fig. 1. The sheets are cut to terminate inwardly of and to leave an exposed marginal portion along the edges of the sides and ends of the die.

A flexible blanket 19, usually formed of rubber, is adapted to cover and enclose the assembly of the sheets on the die. The margin of the blanket is adapted to fit around the edges of the sides and ends of the die and is provided with an inturned flange 20 which is adapted to fit the inner face of the die along said edges to form a seal between the die and the blanket 19. The blanket is adapted to press the sheets of veneer against the die when the apparatus is placed in a pressure and heating chamber, such as a steam chamber, for thermo-setting the glue between the sheets. The blanket is sealed to the margins of the die for preventing the passage of moisture in the steam in the pressure and heating chamber to the veneer during thermo-setting.

The invention also includes means for exerting mechanical pressure against the portion of the blanket which extends around the edge-forming bend in the veneer to compress the veneer in the edge-forming bend between the mold and the blanket. This means comprises a band 21 which extends longitudinally of the die and is formed of flexible metal and is formed of sections arranged longitudinally of the die. This band has its longitudinally extending margins fixedly secured, as by welding, to a bar or rod 22, 23, respectively. A series of rods 24 have hooks which are connected to the bar 22 and to an angle bar 25 which is rigidly secured, for example, by welding, to the base 18. Bar 23 has flexibly connected thereto a series of rods 26, the lower ends of which extend through holes in one of the flanges of an angle bar 27 and are detachably connected thereto by nuts 28. Each of the rods 24, 26 includes a turnbuckle 29. By means of these turnbuckles the necessary degree of tension can be applied to tighten band 21 for exerting localized mechanical pressure against the portion of the blanket which extends around the edge-forming bend in the veneer for pressing tightly together the curved faces of the sheets of veneer in the edge-forming bend between the blanket and the curved edge-forming portion of the die. This pressure along the edge-forming portions of the sheets of veneer shapes the arcuate faces with progressively increasing radii, conformably to the bending of the sheets around the bend 14 of the die, and tightly presses them together for molding them in closely fitting relation at the edge-forming bend. If desired, the turnbuckles 29 on the rods 24 may be omitted.

The chamber between the die and the blanket is subjected to vacuum through suitable nipples 30 which are connected to the die at several points near the edge of the assembly. Vapor developed from the moisture in the veneer during the molding operation would seriously reduce the pressure of the blanket against the veneer around the mold. The vacuum removes the vapor and also carries off any moisture that may leak around the edge of the blanket and in the panel or shell after it has been glued. Such vapor pressure may be so high that blisters will be formed on the panel when the external steam pressure on the blanket is removed. This vacuum may be continued until the panel has been cooled. When the assembly of plies and glue has been placed over the die, and the flexible blanket has been laid over the assembly, the laminations are not compact. When the chamber between the blanket and the veneer is subjected to vacuum, the compacting of the plies begins over large areas at the sides of the mold having little curvature, and starts later in the bend near the top of the mold. As a result, the plies of veneer around the bend will not be compacted and shaped into conforming arcs and by the vacuum, but may buckle, become badly bent, or ultimately break, because the plies of veneer around the bend are restrained into moving downwardly by the pressure of the blanket below the bend. This occurs particularly with a bend extending through an arc of approximately 180° because the plies must be shaped and compacted for the difference in the radii of the successively assembled plies around the bend of the mold. A vacuum pressure of the blanket alone is insufficient to tightly compact and shape the plies of the veneer around the bend if the compacting of the plies initially occurs below the bend. The invention provides for tightening the bands 21 before the vacuum is applied so that the blanket will be initially subjected to mechanical pressure against the veneer in the bend and while the sides or downwardly extending portions of the veneer are not restricted from the relative sliding movement which is necessary while the plies in the bends are being compacted together and compressed. This insures the molding of the plies of veneer in the bend in tightly compacted and conforming relation. This mechanical pressure is retained during the molding operation.

The operation of the apparatus will be as follows: The plies of veneer a interleaved with sheets of or coated with suitable thermo-setting glue are assembled on a work table and temporarily secured together. The assembly will then be laid on the die, as illustrated in Fig. 1, while the blanket 19 and the band 21 are removed from the die. The sheets will be spotted on the die so as to leave an exposed margin on the outer face of the die along its sides and ends. Next, the assembly of sheets will be covered by the blanket 19 and the flanges 20 of the blanket will be folded around the edges of the sides and ends of the die. The band 21 will then be laid over the blanket at the bend in the plies and the rods 24 will be hooked to the angle iron 25. The turnbuckles 29 will then be turned to cause the sections of the band 21 to be tightened against the blanket and to subject the plies of veneer at the bend to sufficient mechanical pressure to conformably shape each to the bend while the plies of veneer at the sides of the mold are not subjected to sufficient pressure to prevent the plies from relative sliding movement necessary in shaping and compacting the plies at the bend. In practice, a sheet of Cellophane (not shown) may be interposed between the blanket and the outer ply of veneer. Clamps 31 are driven over the marginal portions and the flanges 20 of the blanket 19 to form a seal between the blanket and the die. After the veneer has been firmly compacted at the bend, suction will be applied to the chamber between the blanket and the mold. This will cause the side portions of the blanket to compact the plies of veneer at the sides of the mold. In practice, any buckles or waves that may develop in the sides of the plies may be flattened by pounding with a soft mallet until all portions of the side portions of the plies conform to the mold. The assembled mold, blanket and band are then placed in a suitable tank or oven and subjected to pressure and heat, usually steam, for thermo-setting the glue between the plies and accurately and permanently molding them to the desired shape of a panel or shell, such as a wing-section with a curved leading edge of airfoil contour. During the thermo-setting operation, the application of vacuum is continued to remove any moisture in the veneer. The vacuum is continued until the mold has been removed from the tank or oven and cooled. When the panel or shell has been cooled, the rods 24 will be unhooked from bar 25 and the band 21 removed from the blanket. The blanket will then be removed from the die to permit the molded panel to be taken off the die.

The invention is particularly advantageous in molding panels having areas ranging from 4½ by 12½ feet to 11½ by 13 or 14 feet. The panel may be of any desired shape and in molding panels for aircraft wings they are usually tapered longitudinally. In some instances, such as aircraft wings, it is desirable to provide panels having differing wall thickness in different portions thereof, by the use of a varying number of plies with the short plies on the outside of the panel or shell. By using a band 21 formed of sections the apparatus is adapted for molding panels having a different number of plies in different portions thereof. In molding these panels, the band sections can be individually tightened to produce the desired mechanical pressure along the bend of panels having a different number of plies or of different wall-thickness in different portions thereof. When the edge-forming bend of the panels have plies or layers of a different number or different wall-thickness longitudinally of the bend, the sections of the band may be individually tensioned to exert substantially uniform pressure to different longitudinal portions of the bend. The sectional formation of the band also facilitates its application to and removal from the mold when the panels are of great length.

The invention exemplifies apparatus for molding panels with curved edge-forming bends, such as the leading-edge sections of an airplane wing or a control surface, by which the sheets of veneer in the bend can be molded together in closely conforming curves to prevent failure of the leading edge in use. The male die is formed of plate metal which makes it possible to inexpensively produce dies for accurately shaping leading-edge sections or panels of different contours. The apparatus is simple in construction and efficient in molding the panels.

The invention is not to be understood as restricted to the details set forth since these may be modified within the scope of the appended claims without departing from the spirit and scope of the invention.

Having thus described the invention, what I claim as new and desire to secure by Letters Patent is:

1. Apparatus for molding laminated panels having side portions joined by a curved edge-forming bend which comprises a rigid male die having an outer face conforming to the internal contour of the sides and the outwardly curved edge-forming bend desired in the panel, for receiving sheets of veneer interlaid with glue and shaping the panel, a removable elastic blanket adapted to be folded around and cover the assembled sheets on the die, and provided with means at the margins for enclosing the edges of the sides and ends of the sheets on the die and for sealing the blanket to the edge of the die, and adapted to be subjected to fluid pressure, flexible means adapted to extend continuously and longitudinally over the portion of the blanket engaging the edge-forming bend for exerting localized pressure on the blanket at the bend, and means for tensioning the flexible means for compacting the portions of the plies in the bend independently of fluidic pressure against the blanket and adapted to maintain such localized pressure while the blanket is subjected to fluidic pressure.

2. Apparatus for molding plywood panels having side portions joined by a curved edge-forming bend which comprises a rigid male die having an outer face conforming to the internal contour of the sides and the outwardly curved edge-forming bend desired in the panel, for receiving sheets of veneer interlaid with glue and shaping the panel, a removable elastic blanket adapted to be folded around and cover the assembled sheets on the die, and provided with means at its margins for enclosing the edges of the sides and ends of the sheets on the die and adapted to be subjected to fluidic pressure and for sealing the blanket to the edge of the die, a flexible band of metal adapted to extend continuously and longitudinally over the portion of the blanket engaging the edge-forming bend for exerting localized pressure on the blanket at the bend, and means for tensioning the band and compacting the portions of the plies in the bend independently of fluidic pressure against the blanket.

3. Apparatus for molding plywood panels having sides joined by an outwardly curved edge-forming bend which comprises a base, a rigid male die formed of a plate of metal having an outer face conforming to the internal contour of the sides and the edge-forming bend desired in the panel and having a margin substantially coplanar with said outer face, for receiving sheets of veneer interlaid with glue and shaping the panel, a removable elastic blanket adapted to be folded around and cover the assembled sheets on the die and provided with means at its margins adapted to be lapped around the coplanar margin of the plate forming the die for enclosing the edges of the sheets on the die and for sealing the blanket to the die, and flexible means formed of sections adapted to extend continuously and longitudinally over the portion of the blanket engaging the edge-forming bend for exerting localized pressure on the blanket at the bend, and means for tensioning the flexible means for compacting the portions of the plies in the bend independently of fluidic pressure against the blanket.

4. Apparatus for molding laminated panels for hollow leading-edge sections of airfoil cross-section for an airplane element which comprises a rigid male die having an outer face conforming to the internal contour of the sides and the leading-edge desired in the panel, for receiving sheets of veneer interlaid with glue and shaping the panel, a removable elastic blanket adapted to be folded around and cover the assembled sheets on the die, and provided with means at its margin for enclosing the edges of the sides and ends of the sheets on the die, and for sealing the blanket to the edges of the die, flexible means formed of sections adapted to extend around and substantially continuously along the leading edge portion of the panel, and means for separately tensioning the sections against the blanket for exerting localized mechanical pressure for compacting the plies at and along the leading edge portion.

5. Apparatus for molding plywood panels having slides joined by an outwardly curved edge-forming bend which comprises a base, a rigid male die formed of a plate of metal having an outer face conforming to the internal contour of the sides and the edge-forming bend desired in the panel, for receiving sheets of veneer interlaid with glue and shaping the panel, a removable elastic blanket adapted to be folded around and cover the assembled sheets on the die and provided with means at its margins for enclosing the edges of the sheets on the die and for sealing the blanket to the die, flexible means adapted to extend around, and substantially continuously along the edge-forming bend, means for exerting localized mechanical pressure for compacting the plies at and along the bend while leaving the side portions of the plies free for relative movement until fluid pressure is applied to the blanket, and means for subjecting the space around the veneer to vacuum.

6. Apparatus for molding laminated panels for hollow leading-edge sections of airfoil cross-section for an airplane element which comprises a rigid male die formed of a plate of metal having an outer face conforming to the internal contour of the sides and the leading-edge desired in the panel, for receiving sheets of veneer interlaid with glue and shaping the panel, said outer face extending coplanarly to the edge of the plate a removable elastic blanket adapted to be folded around and cover the assembled sheets on the die, and provided with means at its margins adapted to be lapped around the edges of the plate, for enclosing the edges of the sides and ends of the sheets on the plate and sealing the blanket along the edges of the plate, a band of flexible metal adapted to extend continuously and longitudinally over the portion of the blanket engaging the edge-forming bend for exerting localized pressure on the blanket at the bend, and means for tensioning the flexible band for compacting the portions of the plies in the bend independently of fluidic pressure against the blanket.

GEORGE E. KLOOTE.